March 13, 1945.    A. WRIGHT    2,371,417

FILTER

Filed Dec. 12, 1941

INVENTOR
ARTHUR WRIGHT
BY
ATTORNEY

Patented Mar. 13, 1945

2,371,417

UNITED STATES PATENT OFFICE 2,371,417

FILTER

Arthur Wright, Upper Montclair, N. J.

Application December 12, 1941, Serial No. 422,651

6 Claims. (Cl. 210—199)

This invention relates in general to continuous rotary drum filters and more particularly to a belt for compressing the cake formed on the filtering medium and through which water and air may be readily passed for the purpose of washing and drying the cake.

To wash and dry effectively a cake formed on a filter under the influence of a differential pressure, it is essential that the formation of cracks in the cake be avoided, for otherwise the water or air used to wash and dry the cake follows the path of least resistance and passes through these cracks rather than uniformly through every portion of the cake.

In the past, numerous expedients have been resorted to for compressing the cake, but for various reasons none of them have proved to be entirely satisfactory. For example, an endless impervious belt passing over idler rollers has been arranged to contact the cake for the purpose of compressing it and preventing the formation of cracks. Although possibly an impervious belt of this character may prevent the formation of cracks in the cake, the ultimate objective of washing and drying the cake is defeated, for obviously neither wash water nor air can be passed through the belt. Furthermore, since the belt effectively seals the outer surface of the cake, it is impossible by the application of vacuum within the filter to withdraw any water which may be entrained in the cake.

To obviate the difficulties experienced with an impervious belt, resort was then had to a pervious belt, but due to the fact that the interstices or openings in this belt soon became plugged by a portion of the cake which adhered to it, the pervious belt immediately became the full equivalent of the impervious belt.

Another difficulty experienced with both of these types of belts was that they could not be made to track properly over their associated idler rolls without the constant attention of an operator.

The object of this invention is the provision of a compression belt comprising a plurality of spaced strands of cord or rope overlying and traveling with the cake formed on the surface of a rotary drum filter. By suitably spacing the strands of such a belt, the formation of cracks in the cake may be prevented, existing cracks sealed, and both water and air may be made to pass uniformly through every portion of the cake for subjecting it to a displacement wash and for drying it. Also by the provision of suitable guide members for each strand of the belt, the belt may be made to track properly without the attendance of an operator.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
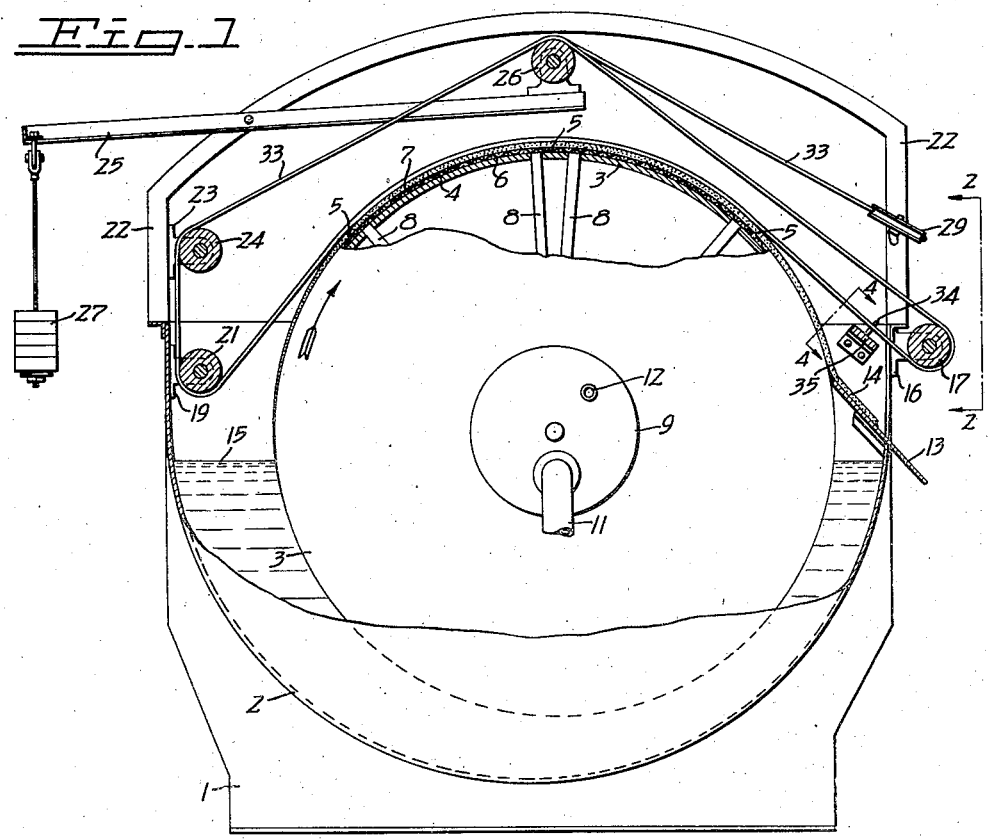
Figure 1 is an end elevation partly in section of a continuous rotary drum filter embodying the objects of my invention.
Figure 2:
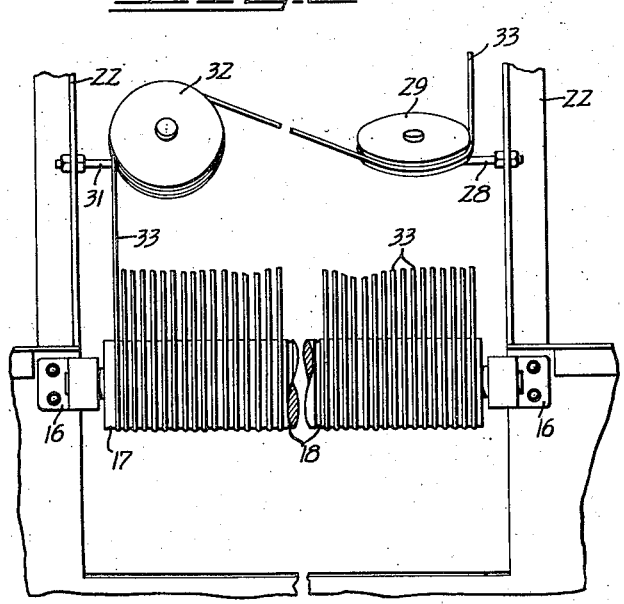
Figure 2 is an enlarged fragmentary front elevation taken on the line 2—2 of Figure 1.

As shown in Figures 1 and 2, the objects of my invention have been embodied in a continuous rotary drum filter of the vacuum type comprising a pedestal or base member 1 which supports a filter tank 2. Rotatably mounted within the tank 2 is a drum 3 which (although not shown in the drawing) is provided at each end with the customary trunnions journaled in suitable bearings supported either by the filter tank or the base or pedestal which supports the filter tank. The drum 3 is formed in the usual manner into successive filtrate compartments 4 by means of peripherally spaced, longitudinally extending division strips 5. Disposed within each of the compartments 4 is a drainage and supporting screen 6 which serves to maintain the filter medium 7 in spaced relation with the drum 3. Each of the filtrate compartments 4 so formed communicates through suitable filtrate pipes 8 with an automatic valve 9 carried by one of the drum trunnions. The valve 9 in its simplest form is provided with a filtrate connection 11 which communicates with any suitable source of vacuum, such as a vacuum pump or vacuum receiver and is also provided with a connection 12 communicating with either atmosphere or a source of superatmospheric pressure. Secured to the tank adjacent the descending side of the drum 3 is a doctor or scraper 13 for aiding in the discharge of the cake 14 formed on the drum.

The construction and operation of the filter as so far described is entirely in accordance with the usual practice. The drum is driven by any suitable means associated with one of the drum trunnions, and as each of the compartments 4 passes through the pulp or slurry 15 contained within the tank, it is subjected to the influence of vacuum, whereupon the solid content of the pulp or slurry is deposited as a cake on the filter medium and a portion of its liquid content passes through the filtrate compartments 4, the filtrate pipes 8, the automatic valve 9, and the filtrate connection 11 to a suitable receiver. Upon emerging from the pulp or slurry 15, each filtrate compartment and the cake carried thereon is maintained under the influence of vacuum for the purpose of subjecting the cake to a displacement wash and for drawing air through the cake in order to dry it if that is desired.

Rotatably mounted on a pair of spaced brackets 16 secured to the tank 2 adjacent the descending side of the drum 3 is an idler roller 17 provided on its surface with spaced peripheral grooves 18. Mounted within the tank 2 on a pair of spaced brackets 19 adjacent the rising side of the drum is an idler roller 21 grooved in the same manner as the idler roller 17. Extending upwardly from each side of the tank 2 is a frame 22. Rotatably mounted on brackets 23 secured to the frames 22 is a grooved idler roller 24 disposed immediately above and parallel to the idler roller 21. Disposed between the two frames 22 and pivoted thereto is a lever 25, on the inner end of which is rotatably mounted a grooved idler roller 26. Depending from the outer end of the lever 25 is an adjustable counterweight 27. Extending inwardly from the right hand frame 22 as shown in Figure 2 is a bracket 28 in which is journaled a pulley 29, and extending inwardly from the left hand frame 22 is a bracket 31 in which is journaled a pulley 32.

Wound around the idler rollers 17, 21, 24, and 26, and over the drum 3, is an endless cord 33 which at the front of the filter passes from the right hand side to the left hand side of the filter over the pulleys 29 and 32. The various convolutions of the cord therefore form a substantially continuous belt which serves to compress the cake. Since the adjacent strands of this belt are positively spaced from each other, both water and air may be readily passed between the adjacent strands, through the filter cake. Although the grooves 18 in each of the idler rollers serve to keep the strands peripherally spaced, the guiding action of the grooves may be supplemented by spaced tines or pins 34 carried on a cross member 35 which is supported by the tank heads adjacent the descending side of the filter drum. The comb thus formed by the spaced tines 34 not only serves to maintain the strands of the cord in proper spaced relation, but also serves to free the strands of the cord of any cake that may have adhered thereto.

The tension under which the endless cord is maintained and consequently the pressure which the belt formed by the convolutions of the cord exerts on the cake, may be controlled at will by varying the mass of the counterweight 27.

Figure 3:
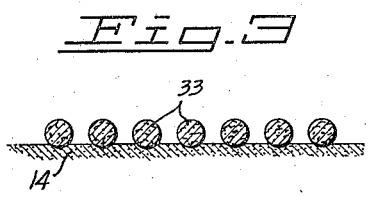
Figure 3 is an enlarged detail illustrating the spaced strands of my press belt and the manner in which they are embedded in the cake carried on the surface of the filter.
Figure 4:
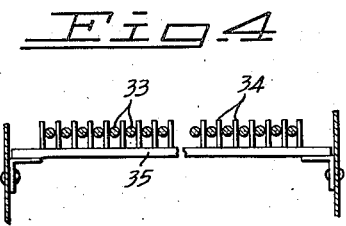
Figure 4 is a section taken on the line 4—4 of Figure 1.

To avoid cracking of the cake due to shrinkage, the adjacent convolutions of the belt should be so spaced from each other that by their being slightly embedded in the cake as illustrated in Figure 3, the strip of cake between adjacent convolutions is condensed or compressed through its entire width. Although the proper spacing between adjacent cords or convolutions depends to some extent on the nature of the cake, it may be said that as a general rule the space between the cords should be no greater than the diameter of the cord. The type of cord used likewise depends to some extent on the nature of the cake involved. For some purposes a metal rope or cable is preferable, although normally ordinary rope or cord should be used.

To wash the cake carried by the drum, spray nozzles may be supported from the frame 22 immediately above the lower reach of the belt, in accordance with standard routine.

It will be seen from the foregoing description that I have provided a belt which effectively serves to compress the cake carried on a drum filter for the purpose of preventing the formation of any cracks in the cake, and that due to the spaced relation of the strands forming this belt, the cake may be readily washed and dried by drawing water and air through the cake. Furthermore, a belt of this character may be made to track accurately without the special attention that is required of the fabricated belts previously used.

Although for most purposes it is desirable to have the adjacent cords of the belt positively spaced from one another as above described, there are instances where a stranded belt in which no space is left between its adjacent cords can be used to advantage. When so used the belt still has considerable advantage over the belts of the prior art, for it can be made to track without attention, whereas difficulty has always been experienced in this respect with other belts.

While the device has been illustrated in connection with a continuous rotary drum filter of the vacuum type, it is immaterial whether the differential filtering pressure is obtained by the use of vacuum, pressure, or a combination of vacuum and pressure. The action of the press belt would be the same in any case. It is also to be observed that my belt can be applied to a top feed filter as well as to a tank feed filter. For this purpose the belt is made to contact the lower side of the drum rather than the upper side as illustrated.

I claim:

1. In a continuous rotary drum filter, a belt for compressing the cake formed on the drum of said filter, comprising: a plurality of parallel cords disposed peripherally over only the cake washing and drying zone of said drum for movement therewith, and means for maintaining said cords under tension and in contact with said drum.

2. In a continuous rotary drum filter, a belt for compressing the cake formed on the drum of said filter, comprising: a plurality of spaced parallel cords disposed peripherally over only the cake washing and drying zone of said drum for movement therewith, and means for maintaining said cords under tension and in contact with said drum.

3. In a continuous rotary drum filter, a device for compressing the cake formed on the drum of said filter, comprising: a set of idler rolls supported in parallelism with said drum; an endless belt passing over said rolls in contact only with the cake washing and drying zone of said drum and comprising a plurality of parallel cords; and means for maintaining said belt under tension.

4. In a continuous rotary drum filter, a device for compressing the cake formed on the drum of said filter, comprising: a set of idler rolls supported by the tank of said filter in parallelism with said drum; an endless belt passing over said rolls in contact only with the cake washing and drying zone of said drum and comprising a plurality of spaced parallel cords; means for maintaining said cords in spaced relation with respect to each other; and means for maintaining said belt under tension.

5. In a continuous rotary drum filter, a device for compressing the cake formed on the drum of said filter, comprising: a set of grooved idler rolls supported by the tank of said filter in parallelism with said drum; an endless cord wound around said rolls over substantially their entire length so as to form a belt, the lower reach of which engages only the cake washing and drying zone of said drum and rotates therewith; means for guiding said cord from one side to the other side of said drum; means for maintaining the adjacent windings of said belt in spaced relation with respect to each other; and means for maintaining said belt under tension.

6. In a continuous rotary drum filter having a cake pick-up zone and a cake washing and drying zone: an endless compression belt formed of spaced parallel strands overlying the drum of said filter in traveling engagement with the cake carried thereby, only over said cake washing and drying zone; and means for maintaining said belt under tension.

ARTHUR WRIGHT.